US006611166B2

(12) United States Patent
Chan et al.

(10) Patent No.: US 6,611,166 B2
(45) Date of Patent: Aug. 26, 2003

(54) CHARGE PUMP LOAD DETERMINATION CIRCUIT

(75) Inventors: Paul S. Chan, Cupertino, CA (US); Raymond Chow, Saratoga, CA (US); Henry K. Wong, Cupertino, CA (US)

(73) Assignee: Sipex Corporation, Billerica, MA (US)

( * ) Notice: Subject to any disclaimer, the term of this patent is extended or adjusted under 35 U.S.C. 154(b) by 0 days.

(21) Appl. No.: 09/840,425

(22) Filed: Apr. 23, 2001

(65) Prior Publication Data

US 2002/0057124 A1 May 16, 2002

Related U.S. Application Data (60) Provisional application No. 60/249,353, filed on Nov. 16, 2000.

(51) Int. Cl.[7] .............................. G05F 1/10; G05F 3/02
(52) U.S. Cl. ....................................................... 327/536
(58) Field of Search ................................ 327/536, 537, 327/589

(56) References Cited

U.S. PATENT DOCUMENTS

| | | | | |
|---|---|---|---|---|
| 5,151,666 A | * | 9/1992 | Tamagawa | 331/158 |
| 5,799,194 A | | 8/1998 | Allen et al. | 395/750.03 |
| 6,018,264 A | * | 1/2000 | Jin | 327/536 |
| 6,163,494 A | * | 12/2000 | Nork | 365/226 |
| 6,278,316 B1 | * | 8/2001 | Tanzawa et al. | 307/110 |
| 6,492,862 B2 | * | 12/2002 | Nakahara | 327/536 |

* cited by examiner

Primary Examiner—Terry D. Cunningham
Assistant Examiner—Quan Tra
(74) Attorney, Agent, or Firm—Testa, Hurwitz & Thibeault, LLP (57) ABSTRACT

Circuit and method for determining the presence of a load in a circuit including on a charge pump. The circuit monitors the state of a pump signal indicative of the operating status of the charge pump. The circuit generates a signal indicating the presence or absence of a load. The signal is used to deactivate features of an associated device, thereby reducing the power consumption and extending the life of the power supply (e.g., battery) for the device.

9 Claims, 8 Drawing Sheets

CHARGE PUMP LOAD DETERMINATION CIRCUIT

CROSS-REFERENCE TO RELATED APPLICATIONS

This application claims priority to provisional application 60/249,353 filed on Nov. 16, 2000, the disclosure of which is incorporated herein as if set forth in its entirety.

FIELD OF THE INVENTION

The present invention generally relates to circuits that determine the presence of a load in a circuit. In particular, the invention relates to circuits that determine the presence of a load in a communications link.

BACKGROUND OF THE INVENTION

Modem portable electronic devices, including laptop computers, personal digital assistants, and cellular telephones, are generally powered by rechargeable batteries. The operating time derived available from a fully charged battery is limited. Once the battery can no longer provide a minimum voltage or power, it must be recharged before subsequent use or replaced with a charged battery. Consequently, it is desirable to reduce power consumption during times when the device is not fully operational to extend battery life. By selectively deactivating device features that are not required, power consumption can be substantially reduced. Unfortunately, it is generally not practical for a device user to determine when a device should be operated in a reduced power mode. For example, when communicating with a remote device, the user may not recognize when communications have been interrupted or terminated, especially if the communications do not require interactions with the user. Thus it is desirable for the device to automatically determine when communications have ended. The present invention relates to circuits and method to determine these inactive periods.

SUMMARY OF THE INVENTION

In one aspect, the present invention relates to a circuit for determining the presence of a load connected to the circuit. In one embodiment, the circuit includes a charge pump and a monitor module. The charge pump has a pump output terminal providing a pump signal indicative of the operating state of the charge pump with a duty cycle indicative of the time the pump signal is in a first state. The monitor module has a monitor output terminal and a monitor input terminal in electrical communication with the pump output terminal. The monitor module provides a status signal indicative of the presence of a load connected to the circuit in response to the duty cycle of the pump signal. In one embodiment the monitor module includes a comparator with a first comparator input terminal in electrical communication with the monitor input terminal, a second comparator input terminal configured to receive a first reference voltage, and a comparator output terminal in electrical communication with the monitor output terminal.

In one embodiment, the monitor module also includes a filter module with a filter input terminal in electrical communication with the monitor input terminal and a filter output terminal in electrical communication with the first comparator input terminal. The filter module generates a voltage substantially proportional to the duty cycle of the pump signal. In another embodiment, the filter module includes a charge module, a discharge module, and a capacitive element. The charge module has a charge input terminal connected to the filter input terminal and a charge output terminal connected to the filter output terminal. The discharge module has a discharge input terminal connected to the filter input terminal and a discharge output terminal connected to the filter output terminal. The capacitive element has a first capacitive terminal connected to the filter output terminal and a second capacitive terminal configured to receive a third reference voltage.

In one embodiment, the charge module includes a PMOS transistor with a source in electrical communication with the filter input terminal, a drain in electrical communication with the first capacitive terminal, and a gate configured to receive a voltage indicative of the supply voltage. In another embodiment, the discharge module includes a NMOS transistor with a source connected to the filter input terminal, a drain connected to the first capacitive terminal, and a gate receiving a voltage indicative of the supply voltage. In yet another embodiment, the charge module includes multiple charge modules each having a charge input terminal electrically coupled to the filter input terminal and a charge output terminal electrically coupled to the first capacitive terminal. In yet another embodiment, each of the multiple charge modules is designed to operate at a particular voltage indicative of the supply voltage.

In another aspect, the present invention provides a method for determining the presence of a load in a circuit having a charge pump. In one embodiment, the method includes the steps of receiving a pump signal indicative of the operating state of the charge pump, determining the duty cycle of the pump signal, and determining in response to the duty cycle whether a load is present in the circuit. In another embodiment, the method also includes the step of generating a status signal indicative of the presence of the load in the circuit in response to the determination of the presence of the load in the circuit. In yet another embodiment, the step of determining whether a load is present in the circuit in response to the duty cycle includes the steps of filtering the pump signal to generate a filtered signal having a substantially DC voltage substantially proportional to a time average of the pump signal and comparing the filtered signal to a reference voltage.

BRIEF DESCRIPTION OF THE DRAWINGS

These and other advantages of the invention may be more clearly understood with reference to the specification and the drawings, in which.

In the drawings, like reference characters generally refer to the same parts throughout the different views. Also, the drawings are not necessarily to scale, emphasis instead being placed upon illustrating the principles of the invention.

DETAILED DESCRIPTION OF THE INVENTION

In brief overview, the present invention relates to a circuit and method for determining the presence of a load in a circuit including a charge pump. The circuit generates a signal having a voltage level indicating the presence or absence of a load. The signal is used in the absence of the load to deactivate features of a device associated with the circuit, thereby reducing the power consumption and extending the life of the power supply (e.g., battery) for the device.

Figure 1:
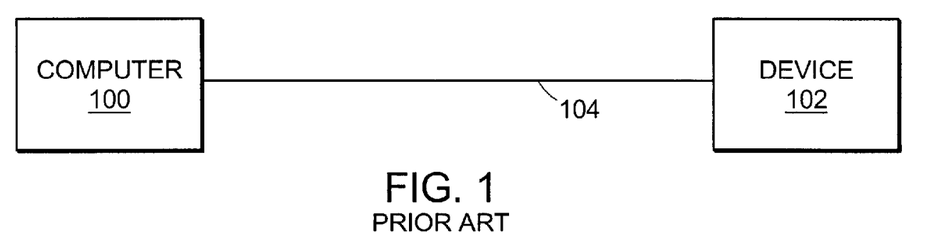
FIG. 1 illustrates an embodiment of a computer in communication with a peripheral device known to the prior art.

FIG. 1, a laptop computer 100 communicates with another device 102 through a communications channel 104 transmitting signals in compliance with the RS-232 communications standard as is known to the prior art. Compliance with this standard requires that certain input and output lines in the communications channel 104 operate at predefined voltages. Many electronics devices internally generate these predetermined voltages using a charge pump in a DC-to-DC voltage converter. Other components of laptop 100, such as port buffers and clock generators, also operate to ensure compliance with the RS-232 standard, further consuming the electrical power available to laptop 100. Generally, these components operate regardless of whether the communications channel 104 is idle or active. When the communications channel 104 is idle, it is desirable to deactivate the charge pump and other components to reduce the power consumption, especially when only a limited supply of power is available as in the case of a battery-powered device.

The charge pump receives a DC supply voltage and generates a DC output voltage of a different magnitude and/or polarity. Conventional charge pump circuits include capacitor arrays that are charged from a supply voltage source (e.g., a battery) using switches operated in a predetermined sequence. A signal indicative of the operative state of the charge pump (e.g., a signal activating or deactivating the charge pump) can be monitored to determine whether the charge pump is supporting communications. If the charge pump is substantially inactive because there is no load at the other end of the communications channel 104, then a signal indicating this inactivity can be used to deactivate unnecessary device features.

Figure 2:
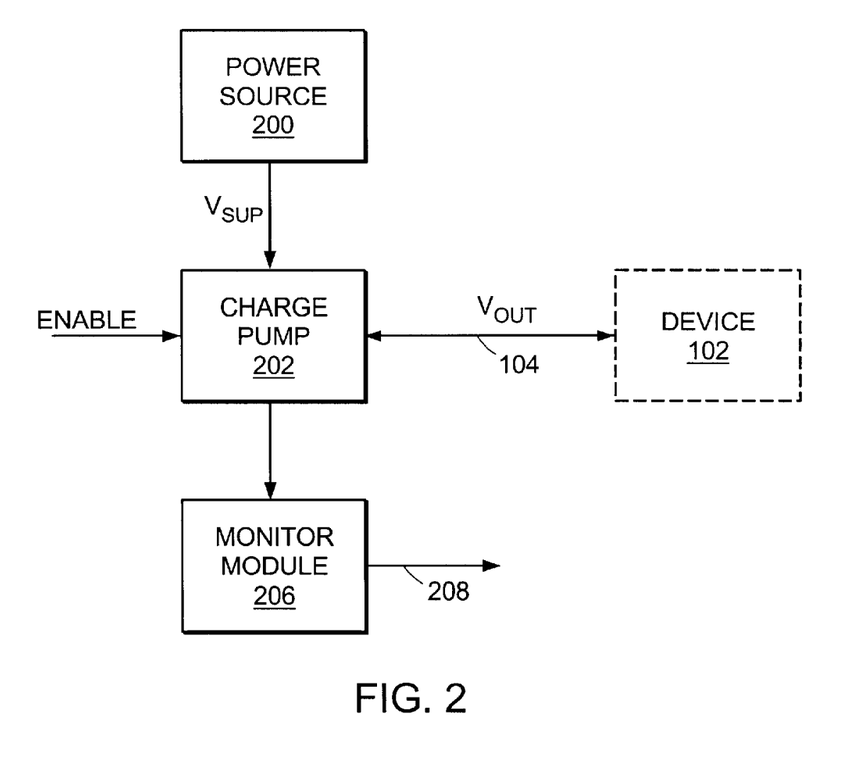
FIG. 2 is a functional block diagram of an embodiment of a circuit for determining the presence of a load in accordance with the present invention.

FIG. 2 depicts an embodiment of a circuit for determining the presence of a device 102. The circuit includes a power source 200 in communication with a charge pump 202. The charge pump 202 is in communication with the device 102 through communications channel 104. The charge pump 202 is also connected to a monitor module 206.

The power source 200 provides a supply voltage Vsup to charge pump 202. The charge pump 202 generates an output voltage Vout to communicate with device 102. The charge pump 202 directly or indirectly provides one or more signals indicating its operating state. The monitor module 206 processes one or more of these signals to generate a status signal 208 having a state indicating the presence or absence of the device 102. The status signal 208 is applied to other circuits (not shown) to deactivate electronics when communications with the device 102 cease. In one embodiment, the monitor module 206 is used to monitor an ENABLE signal used to activate and deactivate the charge pump 202. The determination of whether a device 102 is present is made in response to the determination of the duty cycle of the monitored signal.

Figure 3:
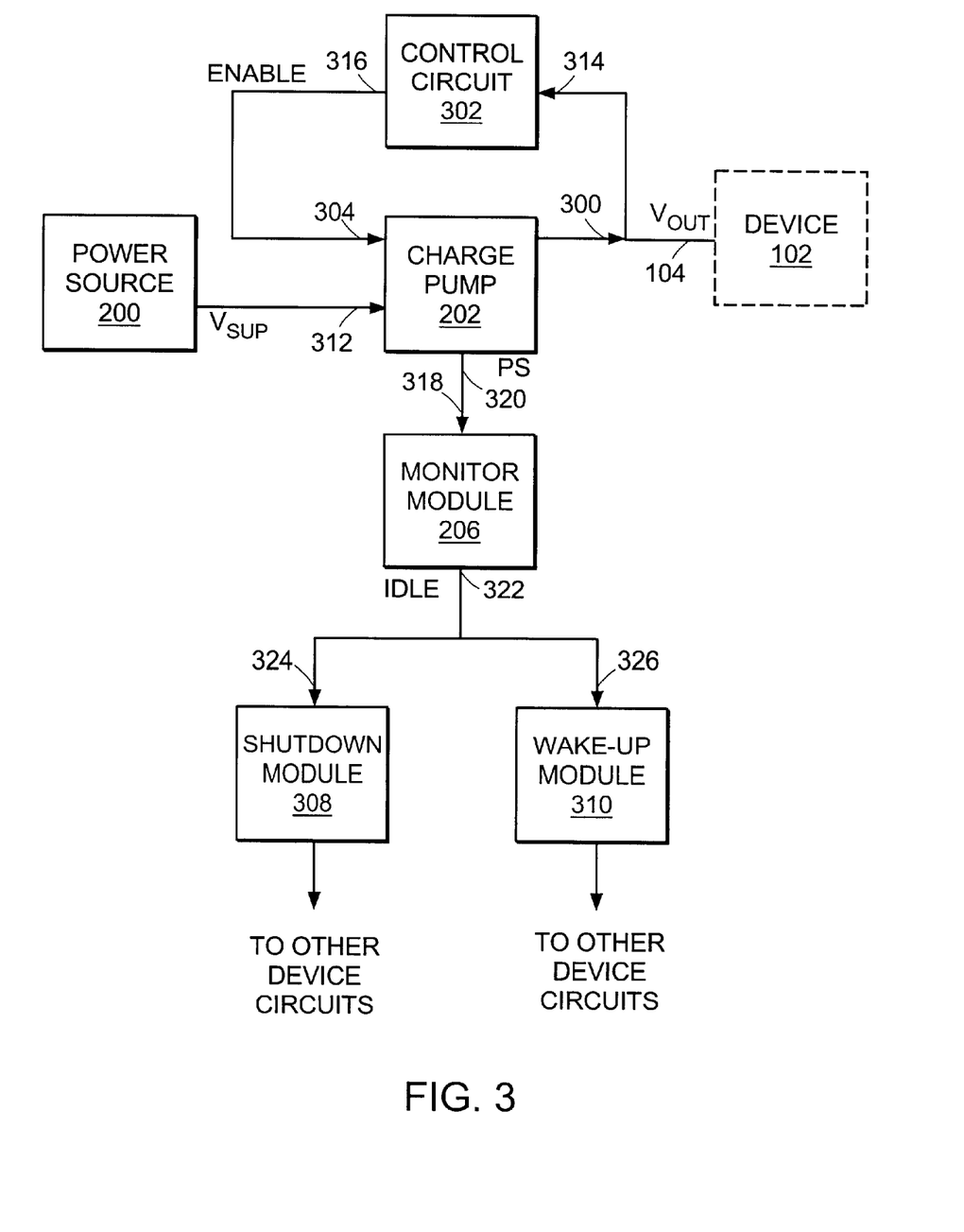
FIG. 3 is a functional block diagram of another embodiment of a circuit for determining the presence of a load in accordance with the present invention.

FIG. 3 is a block diagram depicting in more detail the circuit for indicating the presence of device 102 in the circuit according to one embodiment of the present invention. The circuit includes the power source 200, the charge pump 202, the monitor module 206, a control circuit 302, a shutdown module 308, and a wake-up module 310. The control circuit 302 has an input terminal 314 in communication with charge pump output terminal 300, and an output terminal 316 in communication with an input terminal 304 of the charge pump 202. The monitor module 206 has an input terminal 318 in communication with a pump signal terminal 320 of the charge pump 202, and an output terminal 322. The shutdown module 308 and the wake up module 310 each have an input terminal 324 and 326, respectively, in communication with the monitor module output terminal 322.

In operation, the control circuit 302 monitors the output voltage Vout applied to the load 102 through communication link 104 and, in response, asserts or deasserts an ENABLE signal at output terminal 316. The asserted ENABLE signal activates the charge pump 202 as required to maintain the output voltage Vout in regulation. The monitor module 206 monitors a pump signal (PS) applied to the monitor input terminal 318 to determine the operating state of the charge pump 202. The pump signal PS at the pump signal output terminal 320 can be any signal generated by the charge pump 202 that has states or voltage levels which correspond to the active and inactive states of the charge pump 202. The monitor module 206 generates an output signal IDLE at monitor module output terminal 322 indicative of the duty cycle of the pump signal PS.

Shutdown module 308 receives the IDLE signal at input terminal 324. The shutdown module 308 deactivates features of the device to conserve battery power when the IDLE signal is in a first state indicating that the charge pump 202 has become substantially inactive. When the charge pump 202 is substantially inactive, shutdown module 308 also activates wakeup module 310. Wakeup module 310 receives the IDLE signal at the wakeup module input terminal 326. The wakeup module 310 activates certain device features when the IDLE signal is in a second state indicating that the charge pump has become substantially active (e.g., a load is detected as when communications with a device 102 resume).

The control circuit 302 ensures that Vout remains within a desired range by comparing Vout to a predetermined reference voltage. If the output voltage Vout is less than the reference voltage, the control circuit 302 asserts (or maintains asserted) the ENABLE signal to initiate (or maintain) operation of the charge pump 202. If the output voltage Vout equals or exceeds the reference voltage, then the control circuit 302 deasserts (or maintains deasserted) the ENABLE signal to disable (or maintain disabled) operation of the charge pump 202. This control process repeats as long as the circuit is active.

The magnitude of the load presented by device 102 determines the duty cycle of the ENABLE signal, i.e., the ratio of the time in which the ENABLE signal is asserted during a monitored period and the total time of the monitor period. A large load dissipates electrical power more quickly than a small load, therefore, the control circuit 302 asserts the ENABLE signal for greater durations with a large load in order to maintain the regulated voltage Vout.

Consequently, the ENABLE signal has an increased duty cycle when the load presented by device 102 is large. Conversely, the control circuit 302 asserts the ENABLE signal for shorter durations for smaller loads such that the ENABLE signal has a decreased duty cycle.

Monitor module 206 determines the time averaged value (i.e., DC value) of the ENABLE signal and compares it to a predetermined voltage representative of a minimum acceptable load impedance. If the time averaged value decreases to less than the predetermined voltage, the output signal IDLE of the monitor module 206 is deasserted, indicating that the minimum acceptable load impedance is no longer present at output terminal 300. Conversely, if the time average value increases to the predetermined voltage, the IDLE signal is asserted to indicate that an acceptable load impedance has been coupled to the output terminal 300. Thus, the IDLE signal can be used to activate and deactivate specific functionalities in the host device using the shutdown module 308 and wakeup module 310, respectively.

Figure 4:
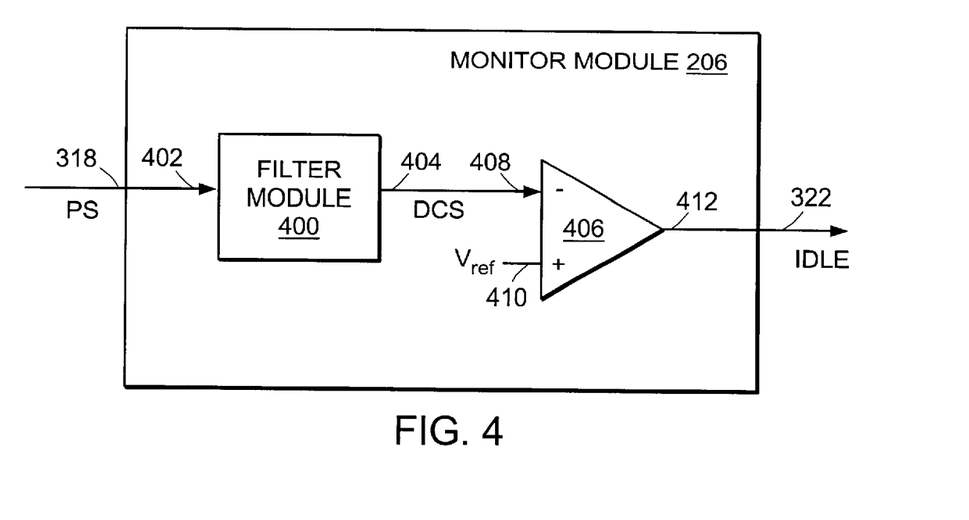
FIG. 4 is a block diagram showing in more detail an embodiment of the monitor module of FIG. 3.

FIG. 4 depicts one embodiment of the monitor module 206 in greater detail. The monitor module 206 includes a filter 400 having a filter input terminal 402 which is the monitor input signal terminal 318. The monitor module 206 also includes a comparator 406 having a comparator first input terminal 408 in communication with the filter output terminal 404, a comparator second input terminal 410 configured to receive a reference signal Vref, and a comparator output terminal 412 which is the monitor module output terminal 322.

In operation, the filter module 400 generates a time averaged signal (DCS) from the monitored pump signal (PS) applied to the monitor input signal terminal 318. The time averaged signal (DCS) is proportional to the value of the load impedance. The comparator 406 compares the time averaged signal (DCS) and the predetermined reference signal $V_{ref}$, and generates an IDLE signal indicating the presence or absence of the device 102. In one embodiment, the IDLE signal is asserted if the time averaged signal (DCS) is less than the reference voltage ($V_{ref}$) indicating the absence of a load such as device 102. Conversely, the IDLE signal is deasserted if the time averaged signal (DCS) exceeds the reference voltage ($V_{ref}$), indicating the presence of a load such as device 102. This comparison permits the time averaged signal (DCS) to be converted to a logic-level signal appropriate to enable or disable other circuitry, for example, shutdown module 308 or wake-up module 310.

Figure 5:
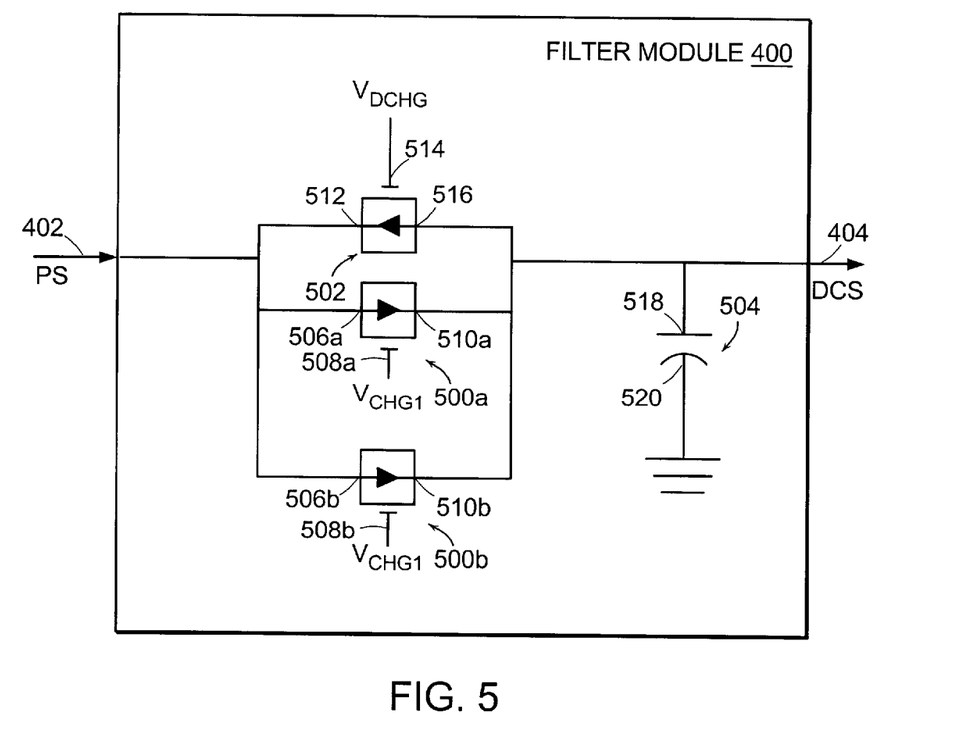
FIG. 5 is a block diagram showing in more detail an embodiment of the filter module of FIG. 4.

FIG. 5 depicts one embodiment of the filter module 400. The filter module 400 includes a first charge module 500a, a second charge module 500b, a discharge module 502, and a capacitive element 504. Each module 500a, 500b, and 502 provides a resistance between its input and output terminals when the module is conductive, i.e., activated by a signal $V_{CHG1}$, $V_{CHG2}$, or $V_{DCHG}$ applied to its control terminal 508a, 508b, or 514, respectively. Thus, an RC circuit which filters (i.e., time averages) the pump signal (PS) applied to the filter module input terminal 402 is realized.

In one embodiment, charge modules 500a and 500b and the discharge module 502 are MOSFET transistors. The charge modules 500a and 500b have input terminals 506a and 506b, respectively, in communication with filter module input terminal 402, control terminals 508a and 508b adapted to receive control voltages $V_{CHG1}$ and $V_{CHG2}$, respectively, and output terminals 510a and 510b, respectively. The discharge module 502 has an output terminal 512 in communication with filter module input terminal 402, a control terminal 514 adapted to receive a control voltage $V_{DCHG}$, and an input terminal 516. The capacitive element 504 has a first terminal 518 in communication with the module terminals 516, 510a, and 510b, and a second terminal 520 in communication with electrical ground.

The filter module 400 is configured to operate with one of two possible supply voltages $V_{SUP}$. Voltage regulation circuitry (not shown) asserts control signal $V_{CHG1}$ and deasserts control signal $V_{CHG2}$ when the supply voltage $V_{SUP}$ is substantially a first predetermined voltage. Voltage regulation circuitry deasserts control signal $V_{CHG1}$ and asserts control signal $V_{CHG2}$ when the supply voltage $V_{SUP}$ is substantially a second predetermined voltage. In one embodiment, the first predetermined voltage is 3 volts, and the second predetermined voltage is 5.5 volts. As a result, only one of the charge modules 500a and 500b is conductive.

If the supply voltage $V_{SUP}$ increases, the charge rate of the capacitive element 504 also increases. Consequently, the components of the charge modules 500a and 500b are selected such that the charge rate of capacitive element 504 remains constant regardless of which of the two supply voltages $V_{SUP}$ is applied. If the charge modules 500a and 500b are implemented as MOSFET transistors, the size of the MOSFET transistors can be selected to achieve the desired equivalent charging rates. Because the rate of discharge of capacitive element 504 is not dependent on the supply voltage $V_{SUP}$, only one discharge module 502 is utilized. The discharge control signal $V_{DCHG}$ is applied to discharge module gate terminal 514 to render discharge module 502 conductive.

When the pump signal (PS) provided at module terminals 506a, 506b, and 512 is logic HIGH, the pump signal (PS) charges capacitive element 504 through one of the charge modules 500a and 500b. When the pump signal (PS) is at logic LOW, charge flows from capacitive element 504 through discharge module 502 to ground. Therefore, when charge pump 202 is active, the charge on capacitive element 504 increases. The time averaged signal (DCS) provided by the filter module 400 under this condition has an increasing voltage.

Figures 6, 6A:
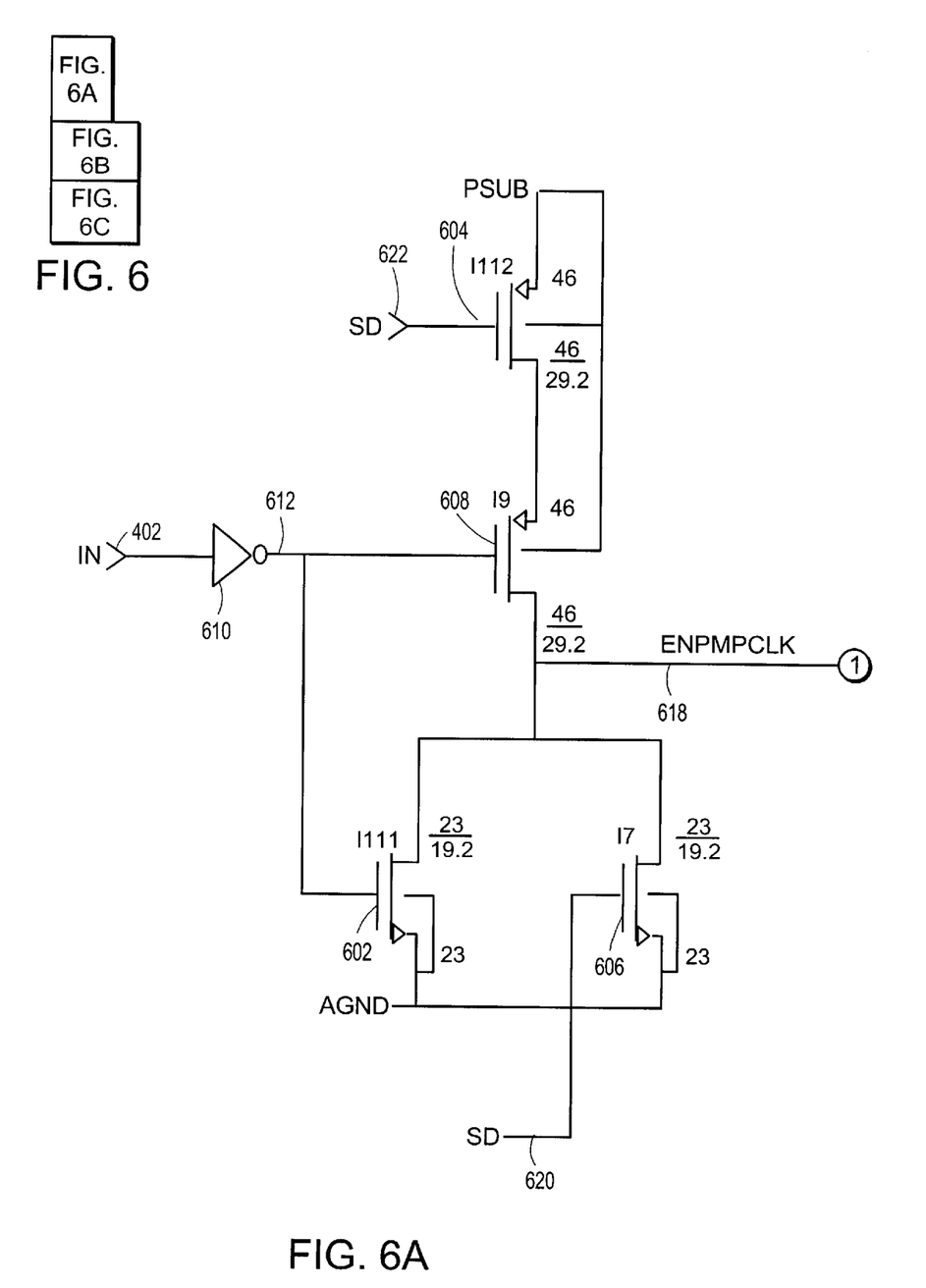
FIG. 6 is a schematic diagram of another embodiment of the filter module of FIG. 4.
Figure 6B:
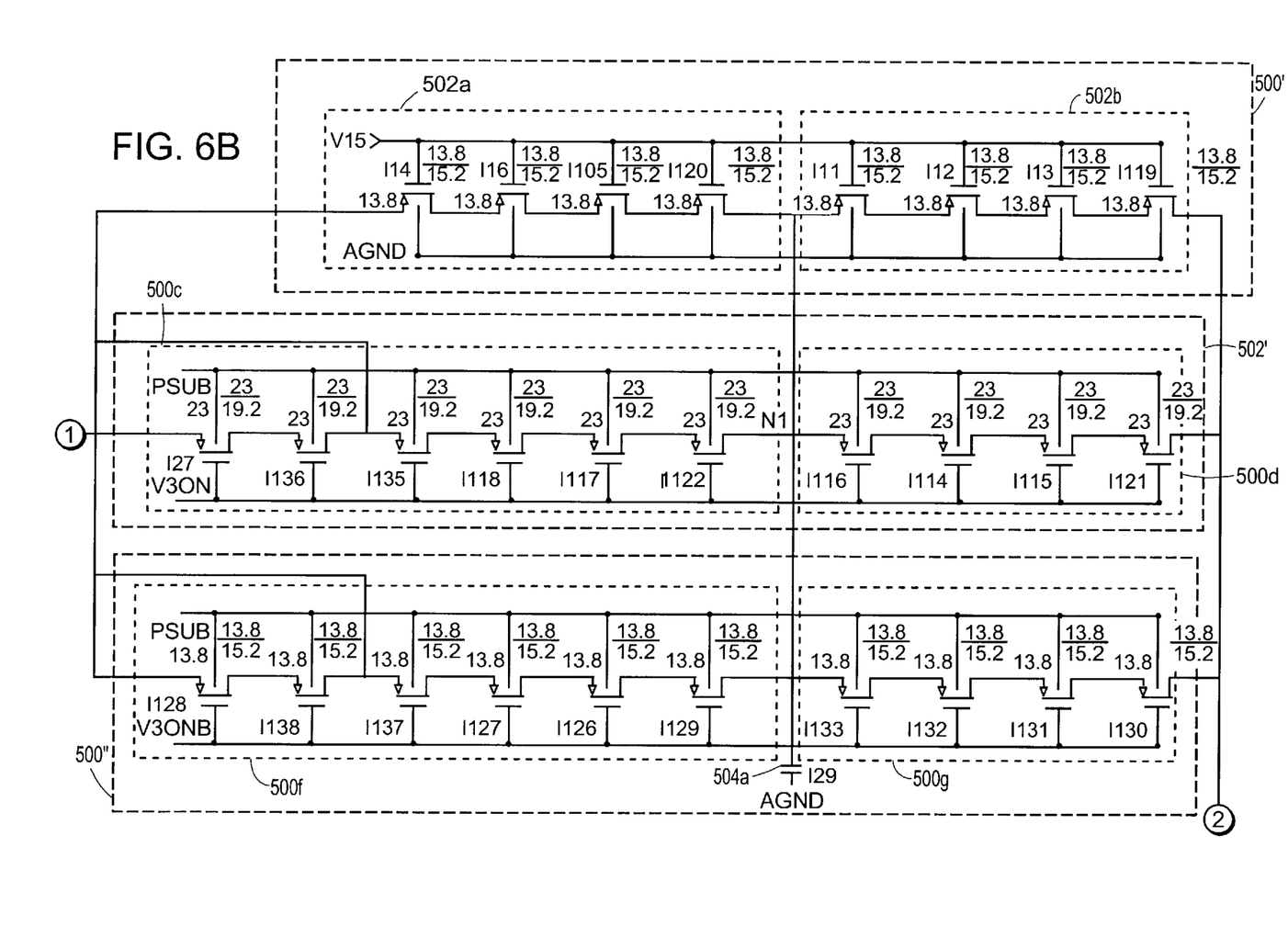
Figure 6C:
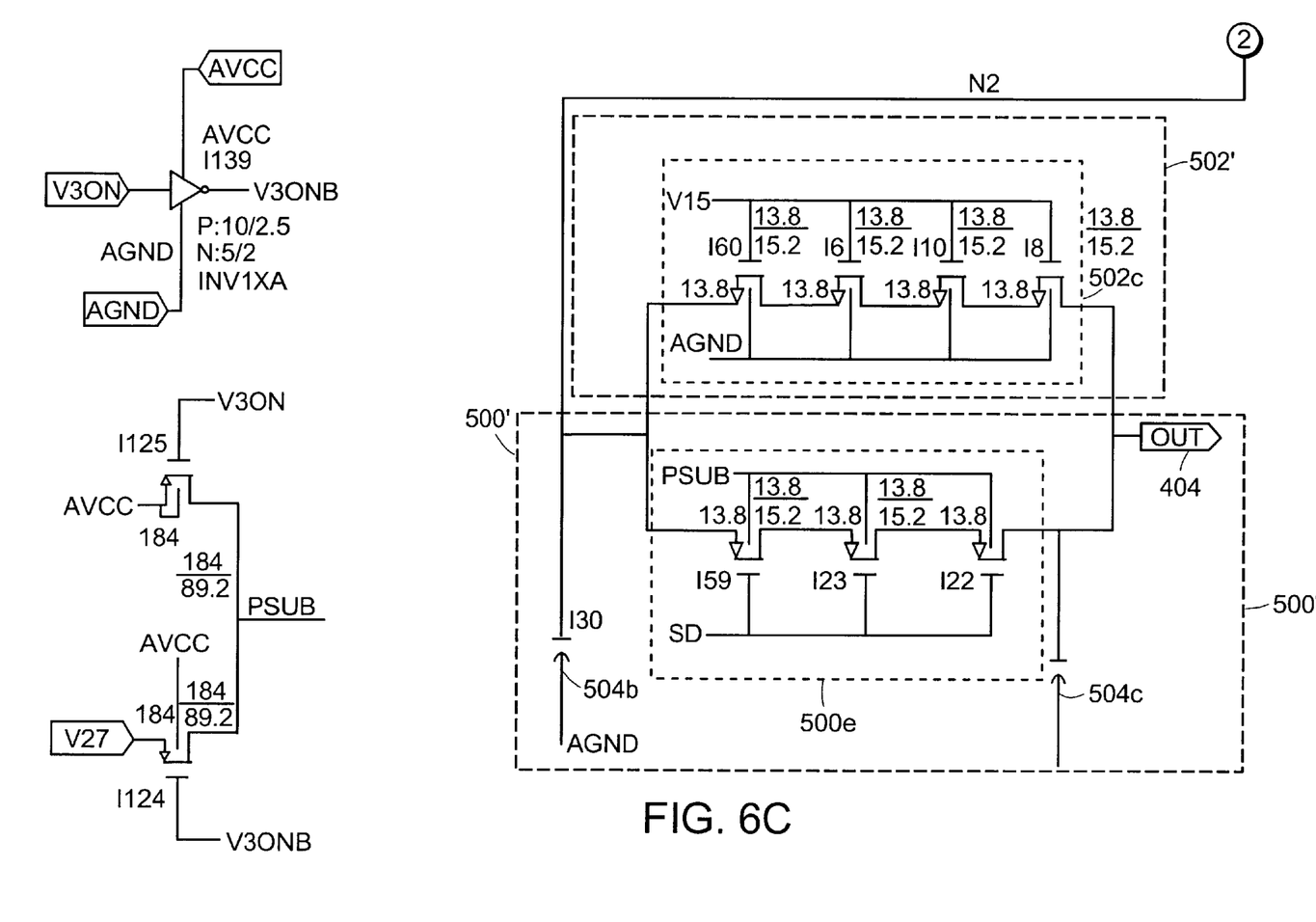

FIG. 6 depicts another embodiment of the filter module 400'. The filter module 400' is similar to that depicted in FIG. 5 except that three-single-stage RC filters replace the one single-stage filter. The filter module 400' also includes transistors 600, 602, 604 and 606 used to amplify the pump signal (PS) applied to terminal 402 and to provide a manual shutdown capability.

When the pump signal (PS) applied to filter terminal 402 is at logic HIGH, inverter 610 generates a complementary logic LOW signal at node 612. As a result, P-channel transistor 600 is rendered conductive and N-channel transistor 602 is rendered nonconductive. If manual shutdown is not selected, shutdown signal (SD) is at logic LOW, causing P-channel transistor 604 to conduct and N-channel transistor 606 to be nonconductive. Consequently, the amplified pump signal ENPMPCLK at node 618 is set at logic HIGH (i.e., at voltage $P_{SUB}$). Conversely, when pump signal (PS) is logic LOW, transistor 600 is rendered nonconductive and transistor 602 is rendered conductive. As a result, the amplified pump signal ENPMPCLK at node 618 is logic LOW (i.e., at voltage AGND). If manual shutdown is selected by asserting shutdown signal (SD) at logic HIGH, P-channel transistor 604 is rendered nonconductive and N-channel transistor 606 is rendered conductive. Under this condition, the state of the other transistors 600 and 602 is not relevant and, therefore, the state of the pump signal (PS) is not controlling. Consequently, the amplified pump signal ENPMPCLK at node 618 remains at logic LOW at least until the shutdown signal SD changes to logic LOW. Thus the time averaged signal (DCS) provided at the output terminal 404 of the filter module 400 decreases towards zero voltage unless the shutdown signal is deasserted.

Charge modules 500*c*, 500*d* and 500*e* are the individual charge modules of a first three-stage charge module 500'. Similarly, charge modules 500*f*, 500*g* and 500*e* are the individual charge modules of a second three-stage charge module 500". Each charge module 500' and 500" includes a serial configuration of P-channel transistors. Charge module 500' corresponds to the single charge module 500*a* of FIG. 5. Similarly, charge module 500" corresponds to the single charge module 500*b* of FIG. 5. Charge module stage 500*e* is the common last stage to both three-stage modules. Capacitive element 504 is replaced by capacitive elements 504*a*, 504*b* and 504*c* (generally 504) for each stage. Only one of the three-stage charge modules is enabled according to the available supply voltage Vsup as previously described.

When amplified pump signal ENPMPCLK is at logic HIGH, charge flows through the P-channel transistors of the active charge modules 500' or 500", charging the respective capacitive elements 504. When signal ENPMPCLK is at logic LOW, charge flows through the N-channel transistors of the discharge modules 502', depleting the charge on the respective capacitive elements 504. The time averaged signal (DCS) provided by the filter module 400 is presented across the capacitive element 504*c* of the last stage.

Figure 7:
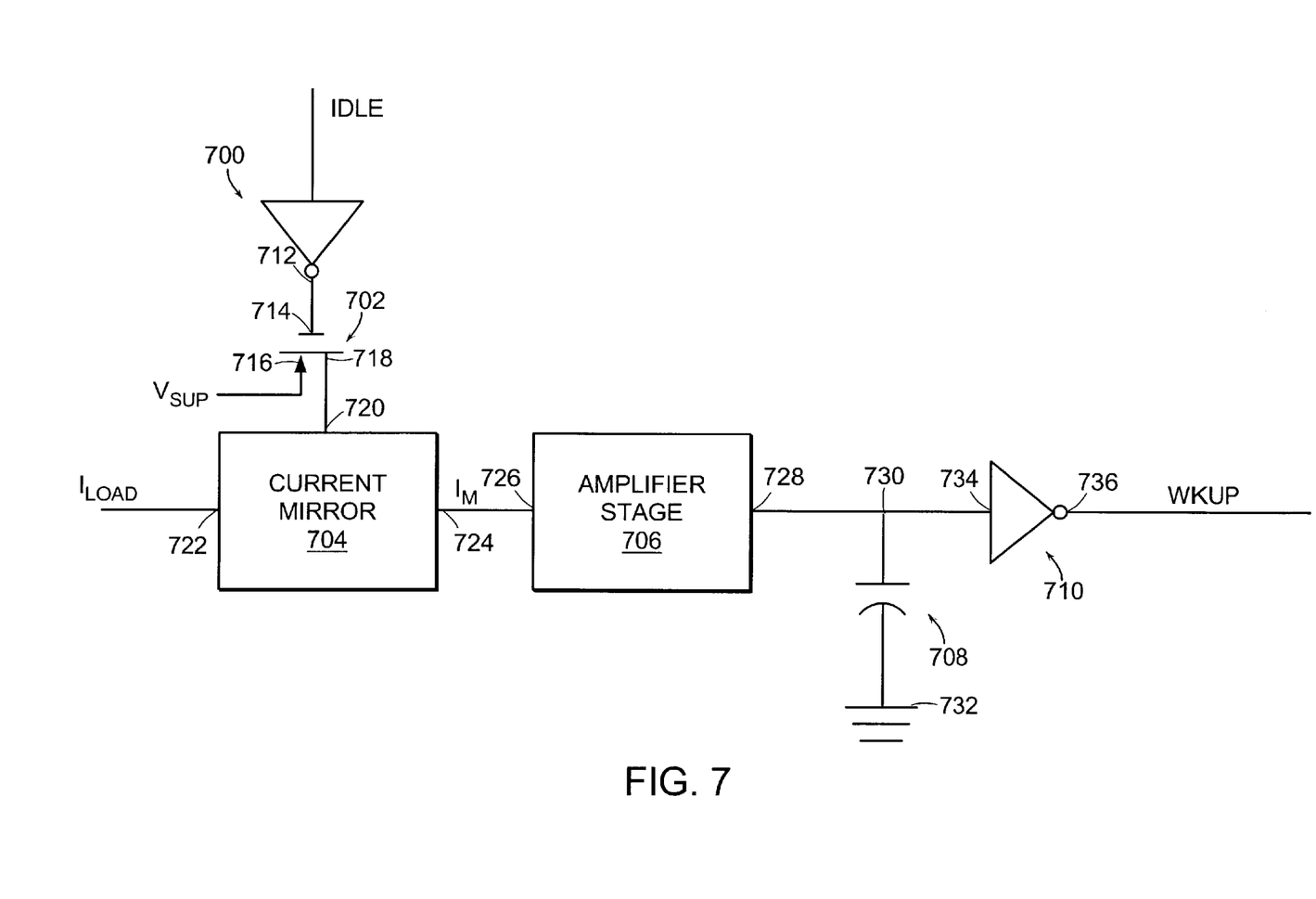
FIG. 7 is a block diagram showing in more detail an embodiment of the wake-up circuit of FIG. 3.

FIG. 7 depicts one embodiment of the wake-up module 310. The wake-up module 310 includes a first inverter 700, a transistor 702, a current mirror 704, an amplifier stage 706, a capacitive element 708, and a second inverter 710. The transistor 702 has a gate terminal 714 in communication with the output terminal 712 of the first inverter 700, an input terminal 716 to receive the supply voltage Vsup, and an output terminal 718. The current mirror 704 has an enable terminal 720 in communication with the transistor output terminal 718, a second input terminal 722 to receive a current ILOAD proportionate to the current drawn by the device 102, and an output terminal 724. The amplifier stage 706 has an input terminal 726 in communication with the current mirror output terminal 724, and an output terminal 728. The capacitive element 708 has one terminal 730 in communication with amplifier stage output terminal 728, and a ground terminal 732. The second inverter 710 has an input terminal 734 in communication with the output terminal 728 of the amplifier stage 706, and an output terminal 736 providing a wakeup signal WKUP.

In operation, when the IDLE signal is logic HIGH, transistor 702 is rendered conductive, enabling current mirror 704. Current mirror 704 generates at output terminal 724 a current IM proportional to the current ILOAD. The mirror current IM is low-pass filtered by capacitive element 708 and inverted by second inverter 710 to generate a wake-up signal WKUP. When asserted, the wake-up signal WKUP is used to activate features of the host device previously deactivated by the shutdown module 308.

Figure 8:
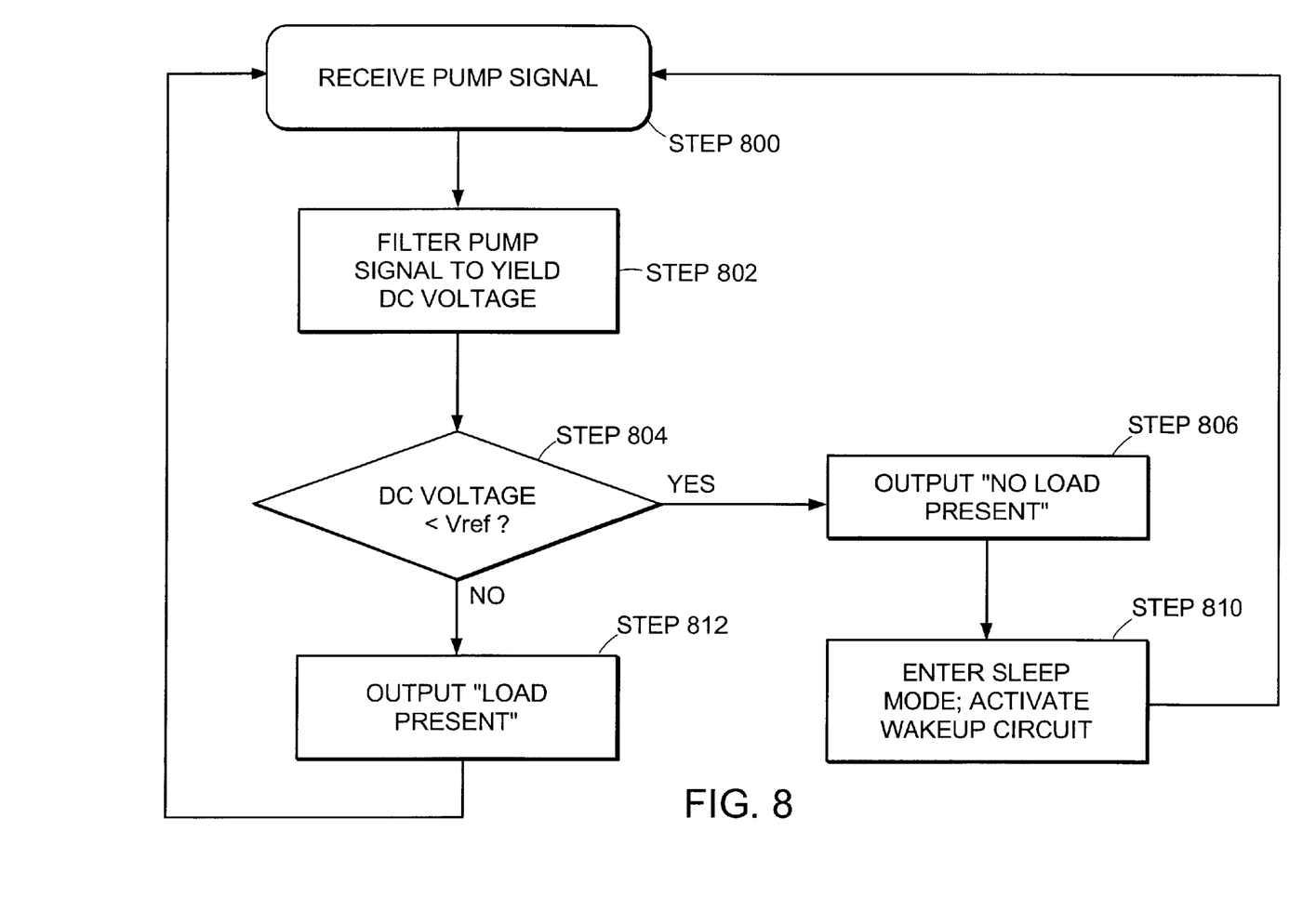
FIG. 8 is a flowchart representation of one embodiment of a method for determining the presence of a load in accordance with the present invention.

FIG. 8 is a flowchart of one embodiment of a method for determining the presence of a load in a circuit according to the present invention. A pump signal indicative of the operating state of the charge pump is received (Step 800). The pump signal is filtered to yield a DC voltage that is substantially proportionate to a time average of the pump signal (Step 802). If the resulting DC voltage is not less than a threshold value (Step 804), a signal is generated indicating that there is no load present in the circuit (Step 806). In one embodiment, when no load is determined to be present, the device enters sleep mode and activates a wake-up circuit (Step 810). The wake-up circuit awaits a wake-up command before returning to Step 800. If the resulting DC voltage is less than the threshold value (Step 804), a signal is generated indicating a load is present on the charge pump (Step 812) and monitoring of the pump signal continues (Step 800).

Many alterations and modifications may be made by those having ordinary skill in the art without departing from the spirit and scope of the invention. Therefore, it must be expressly understood that the illustrated embodiment has been shown only for the purposes of example and should not be taken as limiting the invention, which is defined by the following claims. The following claims are thus to be read as not only literally including what is set forth by the claims but also to include all equivalent elements for performing substantially the same function in substantially the same way to obtain substantially the same result, even though not identical in other respects to what is shown and described in the above illustrations.

What is claimed is:

1. A circuit for determining the presence of a load comprising:

a charge pump having a pump signal terminal for providing a pump signal indicative of an operating state of the charge pump, the pump signal having a duty cycle indicative of the time the pump signal is in a first state; and a monitor module having a monitor input terminal in electrical communication with the pump signal terminal, and a monitor output terminal, the monitor module providing at the monitor output terminal a status signal indicative of the presence of the load in the circuit in response to the duty cycle of the pump signal, wherein the monitor module comprises a comparator having a first comparator input terminal in electrical communication with the monitor input terminal, a second comparator input terminal adapted to receive a first reference voltage, and a comparator output terminal in electrical communication with the monitor output terminal.

2. The circuit of claim 1 wherein the monitor module further comprises a filter module having a filter input terminal in electrical communication with the monitor input terminal and a filter output terminal in electrical communication with the first comparator input terminal, the filter module generating a voltage substantially proportional to the duty cycle of the pump signal.

3. The circuit of claim 2 wherein the filter module comprises:

a charge module having a charge input terminal in electrical communication with the filter input terminal and a charge output terminal in electrical communication with the filter output terminal;

a discharge module having a discharge input terminal in electrical communication with the filter input terminal and a discharge output terminal in electrical communication with the filter output terminal; and a capacitive element having a first capacitive terminal in electrical communication with the filter output terminal and a second capacitive terminal adapted to receive a third reference voltage.

4. The circuit of claim 3 wherein the charge module comprises a PMOS transistor having a source in electrical communication with the filter input terminal, a drain in electrical communication with the first capacitive terminal, and a gate adapted to receive a voltage indicative of a supply voltage.

5. The circuit of claim 3 wherein the discharge module comprises a NMOS transistor having a source in electrical communication with the filter input terminal, a drain in electrical communication with the first capacitive terminal, and a gate adapted to receive a voltage indicative of a supply voltage.

6. The circuit of claim 3 wherein the charge module comprises a plurality of charge modules, each of the charge input terminals being electrically coupled to the filter input terminal, each of the charge output terminals being electrically coupled to the first capacitive terminal.

7. The circuit of claim 6 wherein each of the plurality of charge modules is adapted to operate at a respective one of a plurality of voltages, each of the voltages being indicative of a supply voltage.

8. A method for determining the presence of a load in a circuit having a charge pump, comprising:
   (a) receiving a pump signal indicative of the operating state of the charge pump;
   (b) determining a duty cycle of the pump signal; and
   (c) determining whether a load is present in the circuit in response to the duty cycle wherein step (c) comprises:
      filtering the pump signal to generate a filtered signal having a substantially DC voltage, the filtered signal being substantially proportional to a time average of the pump signal; and
      comparing the filtered signal to a reference voltage.

9. The method of claim 8 further comprising the step (d) generating a status signal indicative of the presence of the load in the circuit in response to the determination of step (c).

* * * * *